US009160685B2

(12) United States Patent  
Somasundaram

(10) Patent No.: US 9,160,685 B2  
(45) Date of Patent: Oct. 13, 2015

(54) LARGE INTERCONNECT FABRICS

(75) Inventor: Madian Somasundaram, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 13/417,091

(22) Filed: Mar. 9, 2012

(65) Prior Publication Data

US 2012/0250698 A1 Oct. 4, 2012

Related U.S. Application Data

(60) Provisional application No. 61/451,301, filed on Mar. 10, 2011.

(51) Int. Cl.
*H04L 12/28* (2006.01)
*H04L 12/935* (2013.01)
*H04L 12/933* (2013.01)
*H04L 12/931* (2013.01)

(52) U.S. Cl.
CPC .......... *H04L 49/3027* (2013.01); *H04L 49/101* (2013.01); *H04L 49/3045* (2013.01); *H04L 49/508* (2013.01)

(58) Field of Classification Search
None
See application file for complete search history.

(56) References Cited

U.S. PATENT DOCUMENTS

| 6,449,283 | B1 | 9/2002 | Chao |
| 6,804,236 | B1 | 10/2004 | Mahajan |
| 7,349,388 | B1 | 3/2008 | Goldrian |
| 7,464,180 | B1 | 12/2008 | Jacobs |
| 7,680,097 | B1 | 3/2010 | Goldstein |
| 7,840,136 | B1 * | 11/2010 | Cunningham et al. .......... 398/45 |
| 7,864,791 | B2 | 1/2011 | Tatar |
| 2002/0085578 | A1 * | 7/2002 | Dell et al. ...................... 370/422 |
| 2007/0116026 | A1 * | 5/2007 | Huang et al. .................. 370/412 |
| 2007/0140284 | A1 | 6/2007 | Blankenship |
| 2008/0098151 | A1 | 4/2008 | Purcell |
| 2011/0106986 | A1 | 5/2011 | Wilkinson |

OTHER PUBLICATIONS

Lin, Mingjie et al., "The Throughput of a Buffered Crossbar Switch," *IEEE Communications Letters, vol. 9, No. 5*, May 2005.

Heusse, Martin, "Router and Switch Architecture," http://membres-liglab.imag.fr/heusse/archi_routeur.pdf, Downloaded Mar. 12, 2012.

Katevenis, Manolis, et al., "Buffered Crossbar (CICQ) Switch Architecture," *Computer Architecture and VLSI Systems (CARV) Lab, Institute of Computer Science (ICS), FORTH,* 2003-2004.

(Continued)

*Primary Examiner* — Nicholas Sloms
(74) *Attorney, Agent, or Firm* — Baker Botts L.L.P.

(57) ABSTRACT

In one embodiment, a network switch includes multiple chips communicably coupled together and a buffered crossbar. Each chip is coupled to every other chip with two bi-directional serial channels and includes a slice of the buffered crossbar. One or more input ports, one or more output ports, and an input logic module are coupled to the plurality of chips, and the input logic module is configured to receive a packet of data, allocate the packet of data into one or more data fragments, and distribute the packet of data to the buffered crossbar. An output logic module is coupled to the chips and configured to retrieve the packet of data from the buffered crossbar, reconstruct the packet of data from the data fragments according to a gather scheme, and transmit the packet of data.

20 Claims, 5 Drawing Sheets

(56) References Cited

OTHER PUBLICATIONS

Passas, George et al., "Packet Mode Scheduling in Buffered Crossbar (CICQ) Switches," *Institute of Computer Science (ICS), Foundation for Research and Technology-Hellas (FORTH)*, 2006.
Passas, George, "Performance Evaluation of Variable Packet Size Buffered Crossbar Switches," *FORTH-ICS/TR-328*, Nov. 2003.
"Building Cisco Multilayer Switched Networks," *BCMSN, V. 1*, version 2.2, 2005.
Singhai, Vinita et al., "High-Speed Buffered Crossbar Switch Design Using Virtex-EM Devices," XAPP240, v1.0, Mar. 14, 2000.
International Search Report and Written Opinion for International Application No. PCT/US2012/028627, Jun. 27, 2012.
Rojas-Cessa, Roberto et al., "CIXOB-k: Combined Input-Crosspoint-Output Buffered Packet Switch," *Globecom '01 IEEE Global Telecommunications Conference*; San Antonio, Texas, Nov. 25, 2001.
Communication pursuant to Article 94(3) EPC re P38895EP-PCT dated Sep. 26, 2014, Application No. 12 711 297.7-1862.

* cited by examiner

LARGE INTERCONNECT FABRICS

RELATED APPLICATION

This application claims the benefit, under 35 U.S.C. §119 (e), of U.S. Provisional Patent Application No. 61/451,301, filed 10 Mar. 2011, which is incorporated herein by reference.

TECHNICAL FIELD

This disclosure generally relates to network switches and more specifically relates to interconnect switch fabrics.

BACKGROUND

A network switch is a data switching device that forwards a data packet from a source network component to a destination network component. Typically, a network switch receives a packet from the source network component via an input port and sends a packet to the destination network component via an output port.

DESCRIPTION OF EXAMPLE EMBODIMENTS

Figure 1:
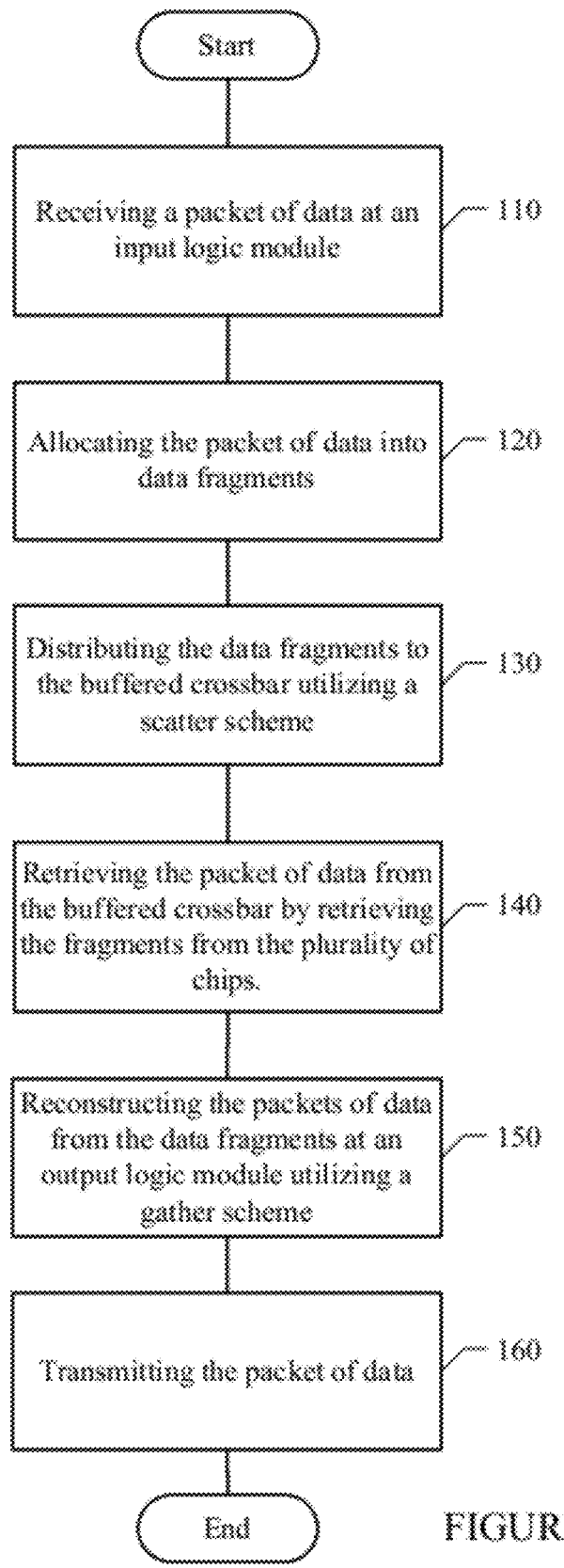
FIG. 1 illustrates an example method of sending data packets utilizing a scatter-gather scheme on a buffered crossbar.

A crossbar switch is a switching device that forwards packets directly from input ports to output ports without buffering. In a buffered crossbar, inputs are connected to the memories directly and data may be written without delay. That is, the memory is written to output after arbitration for a single bus per output. When memory is full, there is a choice of storing in external memory or back-pressuring, which is specific to output port. Since each input and output has dedicated bus to all of its memories, there is no resource conflict. A buffered crossbar may be non-blocking.

In particular embodiments, scatter/gather I/O is a method of input and output by which a single procedure-call sequentially writes data from multiple buffers to a single data stream or reads from data stream to multiple buffers. Scatter/gather refers to the process of gathering data from, or scattering data into, the given set of buffers. Scatter/gather may operate synchronously or asynchronously. Interconnect fabrics are fundamental to all switches. As the number of nodes being connected goes up, the complexity of the fabric also goes up.

Particular embodiments include large scale interconnects that maintain or improve key metrics, such as of power, cost, and latency. In particular embodiments, a switch includes N×N bi-directional serial ports dividing the ports among N chips each with N ports. Particular embodiments connect the chips with two bi-directional serial channels, so that each chip has two bi-directional channels going to each of the other chips. In particular embodiments, the serial channels are time-sliced at least N-ways, one for each port. In particular embodiments, inside each chip is a crossbar with N×N horizontal and N×N vertical lines. Particular embodiments include a memory at each intersection of the horizontal and vertical lines.

Particular embodiments use a buffered crossbar and a scatter-gather scheme for sending data from an input to an output. Particular embodiments utilize large buffered crossbars using a scheme of scattering the input data and gathering the output data via serial channels that are time sliced. Particular embodiments eliminate the need for cross-fabric traffic, request-grant, or arbitration. Thus, in particular embodiments, both flow control decisions and arbitration decisions can be made without additional fabric traffic.

In particular embodiments, when any input port receives a packet of data, the packet is split into pieces and spread across the N chips of the system using the time slot assigned to that input port. In particular embodiments, within the chips, each fragment is stored in the memory at the intersection of the input and the intended output. In particular embodiments, the memory location is the same in every chip for this packet, but each holds different parts of the packet. Particular embodiments of the chip with the output port considers all the packets that lines up for it in its own memory, chooses one, for example at location L. In particular embodiments, the rest of the chosen packet is read at location L in the other memories using the serial channel and the specific time slot for the particular output. In particular embodiments, the resulting reconstructed packet is sent out through the output port.

Particular embodiments result in very low latency. Still, packets are carried across the fabric in order, which may eliminate the need for complex out-of-order schemes. In particular embodiments, the cost and power of the implementation is low. In particular embodiments, a switch may be built using only one kind of chip.

FIG. 1 illustrates an example method for scattering and gathering data packets across a buffered crossbar switch. In particular embodiments, the packets of data may be from a plurality of different flows, such as unicast, multicast, and multiple priorities or qualities of each, for example, low quality (LQ) or high quality (HQ) traffic.

Figure 4:
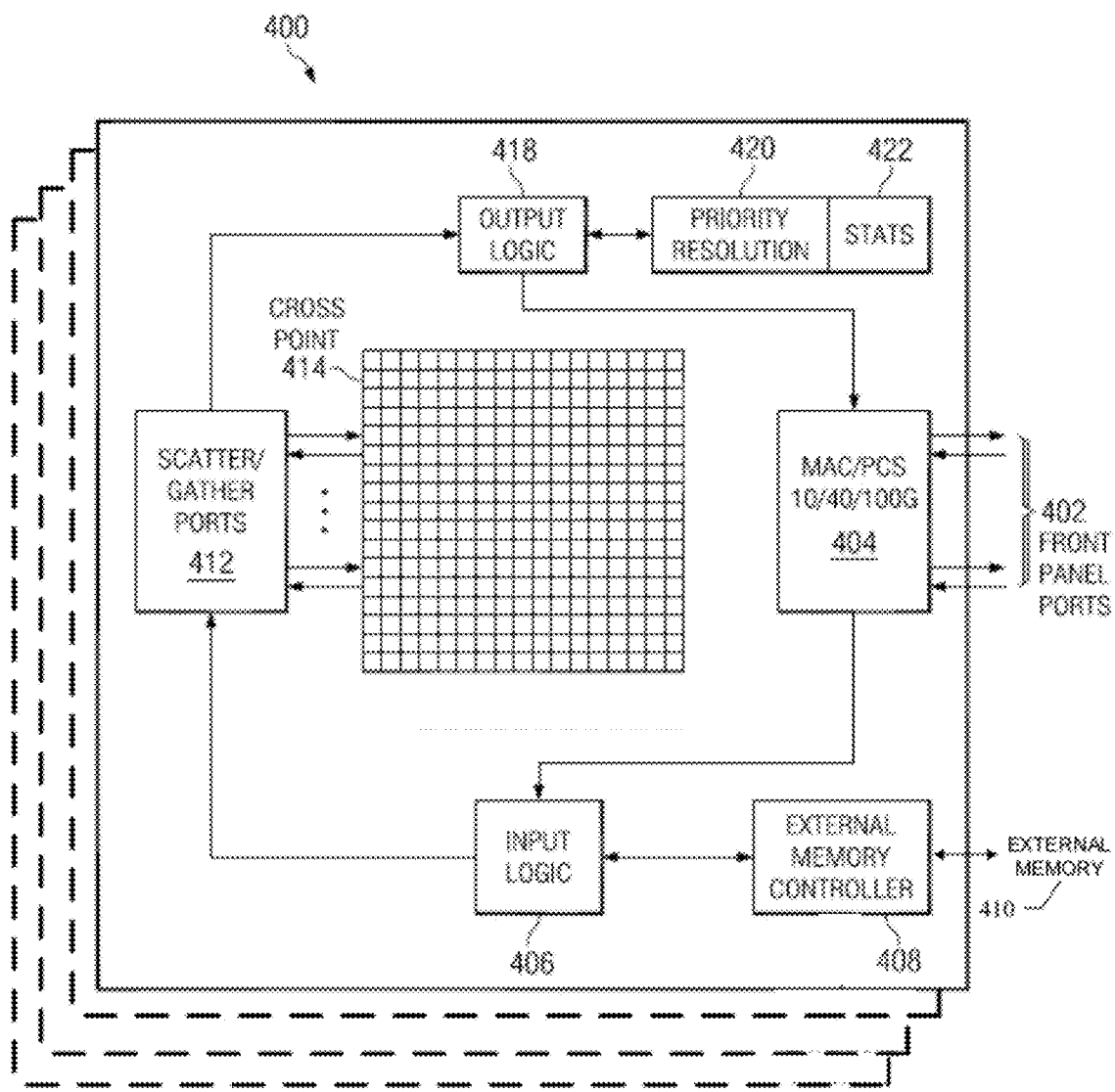
FIG. 4 illustrates an example switch system.

Particular embodiments comprise internal components of a switch or router system in addition to the crossbar fabric. FIG. 4 illustrates an example switch or router system. In the example of FIG. 4, switch 400 comprises front panel ports 402, MAC/PCS 404, input logic 406, external memory controller 408, external memory 410, scatter/gather ports 412, cross point 414, output logic 418, priority resolution 420, and stats 422. In particular embodiments, one or more systems 400 perform one or more steps of one or more methods described or illustrated herein. Particular embodiments include one or more portions of one or more systems 400.

In particular embodiments, data packets are received through a physical connection at front panel ports 402. MAC/PCS 404 comprise input ports that are 10 G, 40 G, and 100 G compatible. The input ports may be configured to couple to a variety of hardware and network protocols. The input ports may comprise one or more physical interfaces to a network. The input port may be configured to both receive and transmit data packets or fragments of the data packets. The method may start at step 110 of FIG. 1, where data packets are received at an input logic module. The data packets may be received at input logic 406. Input logic 406 may comprise logic that receives incoming data packets.

At step 120, the packet of data may be allocated into data fragments. In particular embodiments, the data fragments may each be about the same size. In particular embodiments, the total number of data fragments may be dependant on the number of chips in the plurality of chips. That is, one data fragment may be allocated per chip. In particular embodiments, if the data packet is not large enough to be split into equally sized packets, one for each chip, the data fragments may still be of equal size for as many chips as possible. Input logic 406 comprises logic that may allocate the packets of data into data fragments, that is, input logic 406 may split data packets into cells and sub-cells. In particular embodiments, input logic 406 may comprise a cellulizer that splits the data packets in to cells and sub-cells. Input logic 406 may attempt to detect errors in each data packet by checking the header, bit parity, or using address failure detection (AFD) logic. In particular embodiments, input logic 406 determines the chip and chip address to which each of the data fragments will be sent by performing a fabric port of exit (FPOE) lookup. Input logic 406 may act as a switched port analyzer (SPAN) to select network traffic for analysis by a network analyzer. In particular embodiments, SPAN mirrors traffic from one or more source ports to a destination port for analysis.

External memory controller 408 manages the flow of data and supports transfers between the input logic 406 of switch system 400 illustrated in FIG. 4 and external memory 410. External memory 410 may have separate base addresses and address range than cross point 414.

At step 130, the packet of data may be distributed to the buffered crossbar utilizing a scatter scheme. In particular embodiments, data fragments may be distributed for storage to a particular address on each chip across the plurality of chips of a single buffered crossbar and utilizing a scatter scheme. Packets may be distributed without reference to the final network port destination of the packets. In particular embodiments, sub-cells are scattered to a particular chip and chip address, one sub-cell to each chip in the plurality of chips. In particular embodiments, a single buffered crossbar handles all types of incoming and outgoing traffic, such as unicast, multicast, and multiple priorities of each with respect to quality of service (QoS). In particular embodiments, a single buffered crossbar may handle incoming and outgoing traffic according to QoS. In particular embodiments, some locations on each chip may be reserved for different types of incoming and outgoing traffic, such as unicast, multicast, and based on QoS. In particular embodiments, there may be two buffered crossbars, one buffered crossbar for low-quality traffic and one buffered crossbar for high-quality traffic.

Scatter/gather ports 412 may comprise one or more physical interfaces between input logic 406 and cross point 414. Scatter/gather ports 412 may be configured to couple to a variety of hardware and network protocols. The scatter/gather ports 412 may be configured to both receive and transmit data packets or fragments of the data packets. The scatter/gather ports 412 may be 10 G, or for higher speeds, such as 40 G and 100 G. The scatter/gather ports 412 may be utilized to distribute the data fragments for storage to a particular address space on each chip across the plurality of chips utilizing a scatter scheme.

Cross point 414 comprises a plurality of chips communicably coupled together and comprising a buffered crossbar. Each of the chips in crosspoint 414 may be coupled to each other chip and comprise a slice of the buffered crossbar fabric. In particular embodiments, each chip is mutually exclusive. In particular embodiments, inside each chip is a crossbar with N×N horizontal and N×N vertical lines, where N is an integer greater than 1. Although a simplified buffered crossbar is shown for illustration purposes, in practice, a buffered crossbar may have more than 1000 inputs and 1000 outputs, such as 3000, 4000, 8000, or 10000 inputs/outputs. In particular embodiments, for example, a 4000 port switch may have 64 chips with 64 front-panel ports.

Figure 2A:
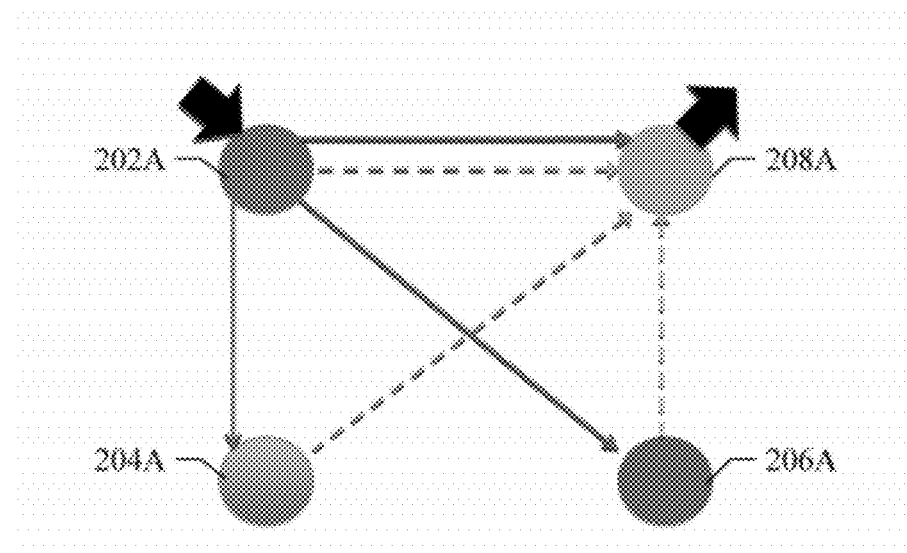
FIG. 2a illustrates an example simplified switch fabric.
Figure 2B:
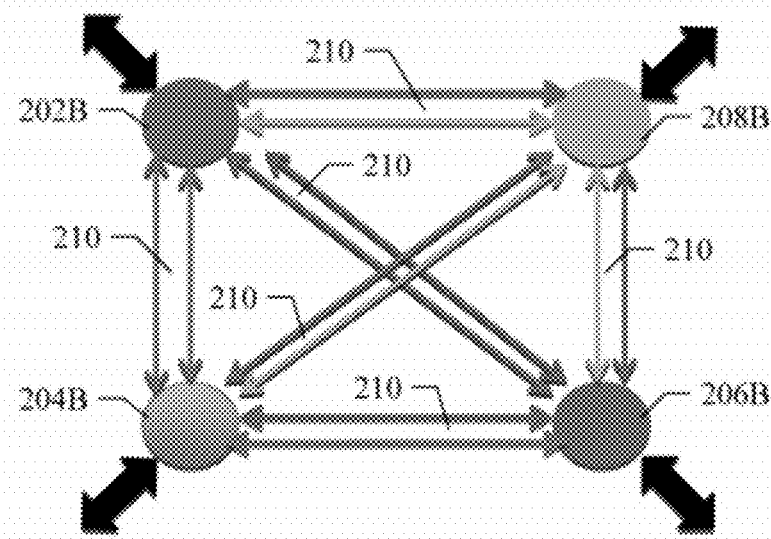
FIG. 2b illustrates another example simplified switch fabric.

FIG. 2A and FIG. 2B illustrate an example simplified switch fabric. In the example of FIGS. 2A and 2B, a fabric is illustrated in a simplified form. The example switch fabric of FIG. 2A has four nodes 202A, 204A, 206A, 208A that are coupled to each other, with an input node 202A and an output node 208A. In particular embodiments, when a packet of data is received at input node 202A, the packet of data may be fragmented into four equal parts. A first fragment, which is one-quarter of the packet of data, may remain at input node 202A, while the three other data fragments, which are each one-quarter of the packet of data, may be sent to each of the other nodes 204A, 206A, and 208A. In particular embodiments, each of the four nodes 202A, 204A, 206A, and 208A are each used to a quarter capacity, and this may reduce connection density. When the data packet is ready to be sent out, the output node 208A, which already has a quarter of the packet of data, collects each of the other three data fragments from nodes 202A, 204A, and 206A, reconstructs the packet of data from the four fragments, and transmits the packet of data.

The example fabric of FIG. 2B has four nodes 202B, 204B, 206B, 208B that are each coupled to each other with two bi-directional serial channels 210. In particular embodiments with M nodes, or chips, with N inputs/outputs each, there may be a total of N*(M−1) bi-directional channels. In particular embodiments with N chips with N inputs/outputs each, there may be N*(N−1) wires coupling the chips. In particular embodiments, bi-directional serial channels 210 may comprise 10 G copper standard connectors or optical connectors, such as a Fiber Distributed Data Interface (FDDI) connector or other types of optical connectors. Switch fabrics may have other N×M densities where N and M are both integers greater than 1. In particular embodiments, for example, switch fabrics may be 2×4 switch fabrics.

In particular embodiments, any of the four nodes 202B, 204B, 206B, 208B may act as an input node or an output node. When a data packet is received at an input node, for example, at node 204B, the data packet may be fragmented into four equal parts. A first data fragment may remain at node 204B, while the three other data fragments are sent to node 202B, 206B, and 208B, respectively. Similarly, a data packet may be received at nodes 202B, 206B, or 208B and then get fragmented into four equal parts and distributed to the other remaining nodes.

With respect to FIG. 2B, when the data packet is ready to be sent out, an output node, for example 206B, which already has a quarter of the packet of data, collects each of the other three data fragments from nodes 202B, 204B, and 208B, reconstructs the packet of data from the four fragments, and transmits the packet of data. Collecting the data fragments, reconstructing the packets of data, and transmitting the packets of data may also occur at any of the three other nodes that were not the initial input node.

Figure 3:
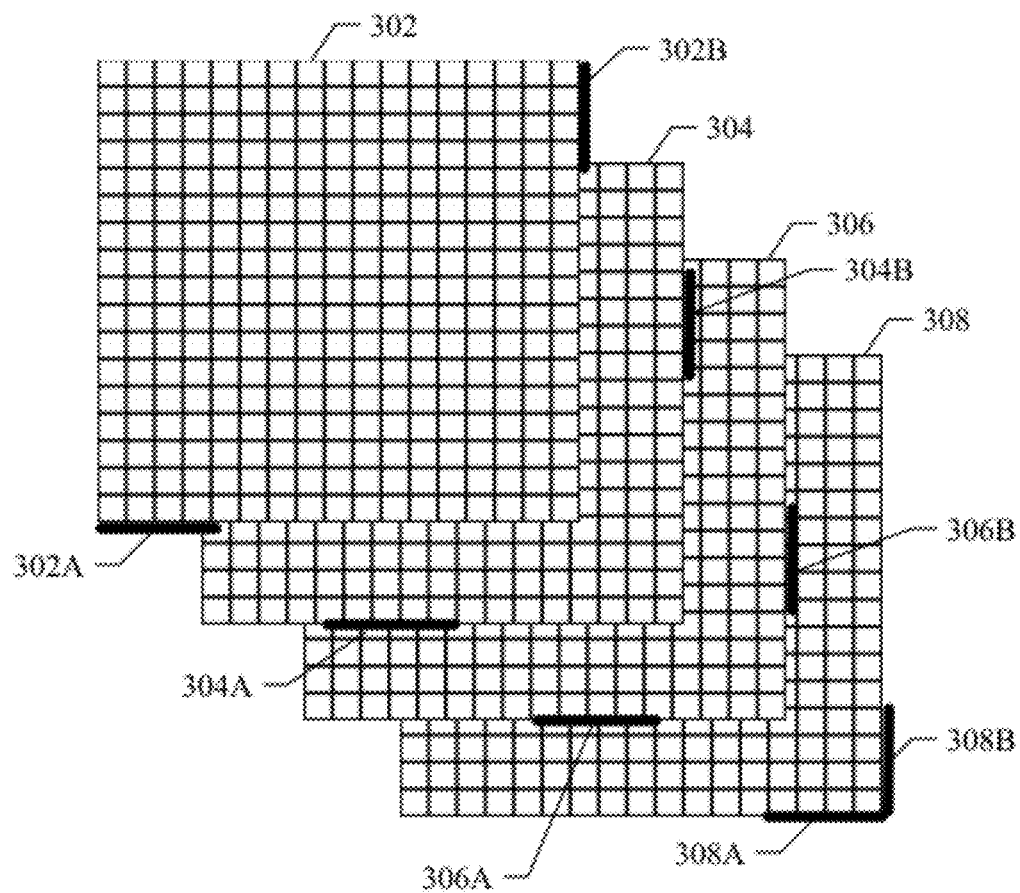
FIG. 3 illustrates an example buffered crossbar with scatter-gather.

FIG. 3 illustrates an example buffered crossbar with scatter-gather. In the example of FIG. 3, the crossbar is divided into four planes. Four chips 302, 304, 306, 308 are illustrated that each have N inputs and N outputs. Each chip 302, 304, 306, 308 has an image of the whole system. In order to simplify the example of FIG. 3, each chip is shown with four inputs and four outputs. For example, chip 302 has four inputs 302A and four outputs 302B, chip 304 has four inputs 304A and four outputs 304B, chip 306 has four inputs 306A and four outputs 306B, and chip 308 has four inputs 308A and four outputs 308B. In particular embodiments, when a packet of data is received at input 302A, for example, the packet of data may be fragmented into four equal parts. While one data fragment may remain on chip 302, each of the other fragments may be distributed to particular locations on chips 304, 306, and 308, respectively. In particular embodiments, chips 304, 306, 308 may look like memory to the master chip 302. Alternatively, each chip 302, 304, 306, 308 may act as a master chip to the rest of the chips depending on which input ports receive data packets. In particular embodiments, the fragments may be distributed to the same address on the other chips. When the data packet is ready to be sent out, output 308B, which already has a quarter of the packet of data, collects each of the other data fragments from chips 306, 304, 302, reconstructs the packet of data from the fragments, and transmits the packet of data. The outputs 302B, 304B, 306B, 308B may be determined by arbitration.

At step 140, the packets of data is retrieved from the buffered crossbar by retrieving the one or more data fragments from the plurality of chips. Output logic module is coupled to the plurality of chips. The output logic module is configured to retrieve and reassemble the packet of data from the plurality of chips. At step 150, the packets of data are reconstructed from the data fragments at an output port according to a gather scheme. In particular embodiments, sub-cells are combined to form a cell, and cells are combined to recreate the packet of data. The packet of data is reassembled from a plurality of different flows, such as unicast, multicast, and multiple priorities of each. In particular embodiments, there is one output port for every input port. In particular embodiments, there may be greater than one output port for each input port.

Output logic module 418 may reassemble the packet of data from cells and sub-cells. Data packets may be reassembled based on type of data flow or QoS. Priority resolution module 420 may determine which data packets are going to be reassembled based on type of data flow or QoS. Stats module 422 may monitor all traffic routed through switch 400 and collect statistics on the data flow relating to hardware and software information. Hardware information may include information, such as packet and byte counts, start and end timestamps, source and destination IP addresses, IP protocol, and source and destination port numbers. Software information may include information, such as input identifier, output identifier, routing information including next-hop address, origin and peer egress traffic, and source and destination prefix mask.

At step 150, the packet of data is transmitted to other nodes in the network, at which point the method may end. Data packets may be sent out through MAC/PCS 404 and the physical connections on front panel ports 402 to destination endpoints. Particular embodiments may repeat the steps of the method of FIG. 1, where appropriate. Moreover, although this disclosure describes and illustrates particular steps of the method of FIG. 1 as occurring in a particular order, this disclosure contemplates any suitable steps of the method of FIG. 1 occurring in any suitable order. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 5:
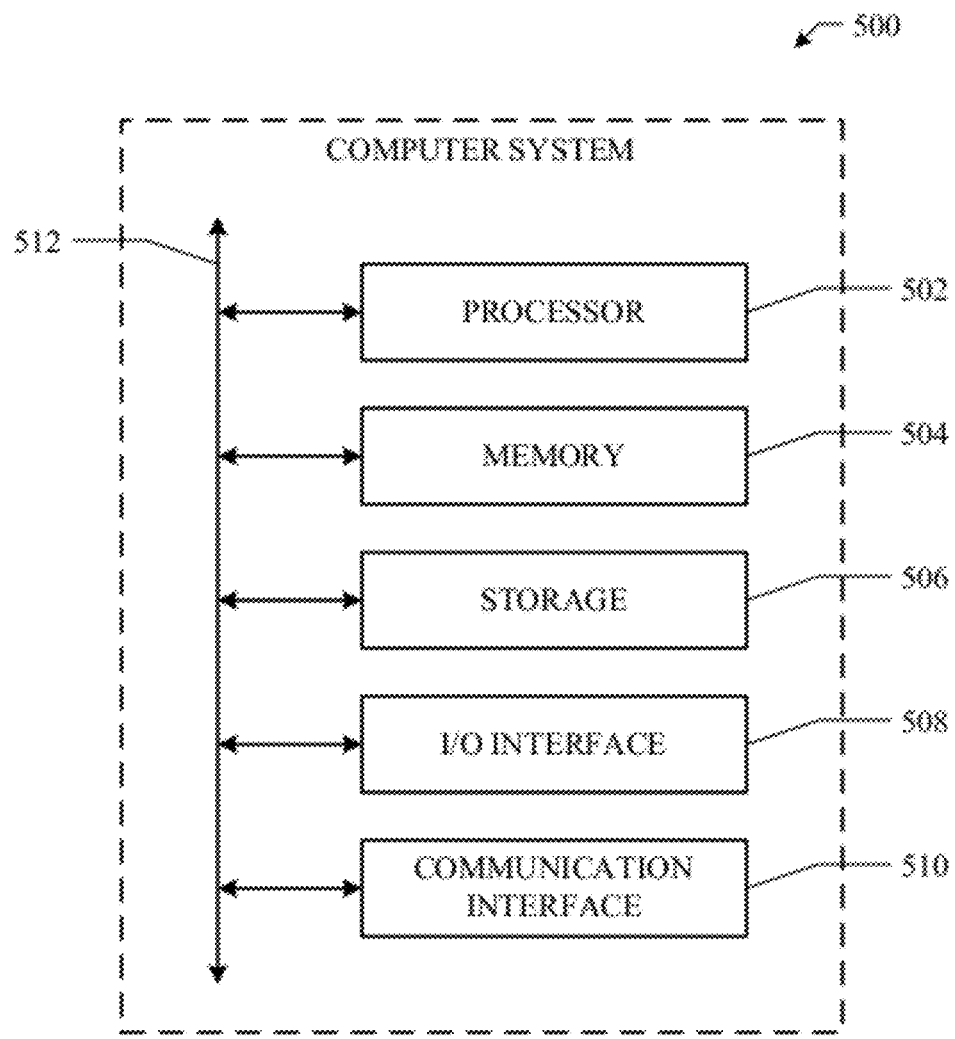
FIG. 5 illustrates an example computer system.

Particular embodiments may be implemented on one or more network devices. FIG. 5 illustrates an example network device 500. In particular embodiments, one or more devices 500 perform one or more steps of one or more methods described or illustrated herein. In particular embodiments, one or more devices 500 provide functionality described or illustrated herein. In particular embodiments, software running on one or more devices 500 performs one or more steps of one or more methods described or illustrated herein or provides functionality described or illustrated herein. Particular embodiments include one or more portions of one or more devices 500.

This disclosure contemplates any suitable number of devices 500. This disclosure contemplates device 500 taking any suitable physical form. As example and not by way of limitation, device 500 may be an embedded device, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, device 500 may include one or more devices 500; be unitary or distributed; span multiple locations; span multiple machines; or reside in a cloud, which may include one or more cloud components in one or more networks. Where appropriate, one or more devices 500 may perform without substantial spatial or temporal limitation one or more steps of one or more methods described or illustrated herein. As an example and not by way of limitation, one or more devices 500 may perform in real time or in batch mode one or more steps of one or more methods described or illustrated herein. One or more devices 500 may perform at different times or at different locations one or more steps of one or more methods described or illustrated herein, where appropriate.

In particular embodiments, network device 500 includes a processor 502, memory 504, storage 506, an input/output (I/O) interface 508, a communication interface 510, and a bus 512. Although this disclosure describes and illustrates a particular device having a particular number of particular components in a particular arrangement, this disclosure contemplates any suitable device having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, device 500 may load instructions from storage 506 or another source (such as, for example, another device 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to device 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between device 500 and one or more I/O devices. Device 500 may include one or more of these I/O devices, where appropriate. One or more of these I/O devices may enable communication between a person and device 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between device 500 and one or more other devices 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, device 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, device 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Device 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of device 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

This disclosure contemplates one or more computer-readable storage media implementing any suitable storage. In particular embodiments, a computer-readable storage medium implements one or more portions of processor 502

(such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A network switch, comprising:
    a plurality of chips communicably coupled together and comprising a buffered crossbar, each chip coupled to each other chip with two bi-directional serial channels, each chip comprising a slice of the buffered crossbar;
    one or more input ports;
    one or more output ports;
    an input logic module coupled to the plurality of chips, the input logic module configured to:
        receive a packet of data;
        allocate the packet of data into a plurality of data fragments, wherein a total number of the plurality of data fragments is dependent on a number of the plurality of chips comprising the buffered crossbar; and
        distribute the packet of data to the buffered crossbar, each data fragment being distributed to a particular chip comprising a slice of the buffered crossbar according to a scatter scheme, each of the plurality of chips receiving a selected one of the plurality of data fragments; and
    an output logic module coupled to the plurality of chips, the output logic module configured to:
        retrieve the packet of data from the buffered crossbar by retrieving the plurality of data fragments from the plurality of chips;
        reconstruct the packet of data from the plurality of data fragments according to a gather scheme; and
        transmit the packet of data.

2. The network switch of claim 1, wherein the slice of the buffered crossbar comprises
    N×N horizontal lines;
    N×N vertical lines where N is an integer greater than one; and
    a memory at each intersection of the horizontal and vertical lines.

3. The network switch of claim 1, wherein a portion of the buffered crossbar is allocated in accordance with quality of service.

4. The network switch of claim 3, the portion of the buffered crossbar is allocated for one of unicast or multicast.

5. The network switch of claim 1, wherein each of the plurality of data fragments are equally sized.

6. The network switch of claim 1, wherein each of the the plurality of data fragments are distributed to a particular memory location on the particular chip, the particular memory location corresponding to an intersection of the input port and an intended output port.

7. The network switch of claim 1, wherein the bi-directional serial channels are time-sliced for each input port and output port.

8. The network switch of claim 7, wherein each of the plurality of data fragments are distributed to a particular one of the plurality of chips according to a time slot assigned to a particular input port.

9. A system comprising:
    a network switch, comprising:
        a plurality of chips communicably coupled together and comprising a buffered crossbar, each chip coupled to each other chip with two bi-directional serial channels, each chip comprising a slice of the buffered crossbar;
        one or more input ports;

one or more output ports;
an input logic module coupled to the plurality of chips, the input logic module configured to:
receive a packet of data;
allocate the packet of data into a plurality of data fragments, wherein a total number of the plurality of data fragments is dependent on a number of the plurality of chips comprising the buffered crossbar; and
distribute the packet of data to the buffered crossbar, each data fragment being distributed to a particular chip comprising a slice of the buffered crossbar according to a scatter scheme, each of the plurality of chips receiving a selected one of the plurality of data fragments; and
an output logic module coupled to the plurality of chips, the output logic module configured to:
retrieve the packet of data from the buffered crossbar by retrieving the plurality of data fragments from the plurality of chips;
reconstruct the packet of data from the plurality of data fragments according to a gather scheme; and
transmit the packet of data;
a memory comprising instructions executable by one or more processors; and
the one or more processors coupled to the memory.

10. The system of claim 9, wherein the slice of the buffered crossbar comprises
N×N horizontal lines;
N×N vertical lines where N is an integer greater than one; and
a memory at each intersection of the horizontal and vertical lines.

11. The system of claim 9, wherein a portion of the buffered crossbar is allocated in accordance with quality of service.

12. The system of claim 11, the portion of the buffered crossbar is allocated for one of unicast or multicast.

13. The system of claim 9, wherein each of the plurality of data fragments are equally sized.

14. The system of claim 9, wherein each of the plurality of data fragments are distributed to a particular memory location on the particular chip, the particular memory location corresponding to an intersection of the input port and an intended output port.

15. The system of claim 9, wherein the bi-directional serial channels are time-sliced for each input port and output port.

16. The system of claim 15, wherein each of the plurality of data fragments are distributed to a particular one of the plurality of chips according to a time slot assigned to a particular input port.

17. A method comprising:
by one or more network switches:
receive a packet of data at an input logic module coupled to a plurality of chips comprising a buffered crossbar, each chip coupled to each other chip and comprising a slice of the buffered crossbar;
allocate the packet of data into a plurality of data fragments, wherein a total number of the plurality of data fragments is dependent on a number of the plurality of chips comprising the buffered crossbar;
distribute the packet of data to the buffered crossbar through one or more input ports, each data fragment being distributed to a particular chip comprising a slice of the buffered crossbar according to a scatter scheme, each of the plurality of chips receiving a selected one of the plurality of data fragments;
retrieve the packet of data from the buffered crossbar at an output logic module through an output port by retrieving the plurality of data fragments from the plurality of chips, the output logic module coupled to the plurality of chips;
reconstruct the packet of data from the plurality of data fragments according to a gather scheme; and
transmit the packet of data.

18. The method of claim 17, wherein each of the plurality of data fragments are distributed to a particular memory location on the particular chip, the particular memory location corresponding to an intersection of the input port and an intended output port.

19. The method of claim 17, wherein the bi-directional serial channels are time-sliced for each input port and output port.

20. The method of claim 19, wherein each of the plurality of data fragments are distributed to a particular one of the plurality of chips according to a time slot assigned to a particular input port.

* * * * *